United States Patent [19]

Beekman

[11] Patent Number: 4,500,444
[45] Date of Patent: Feb. 19, 1985

[54] PROCESS FOR PREPARING BASIC ALUMINUM CARBONATE GELS SUBSTANTIALLY FREE FROM FOREIGN ANIONS AND FIBROUS COLLOIDAL ALUMINA MONOHYDRATE OF A BOEHMITE CRYSTAL LATTICE STRUCTURE

[76] Inventor: Stewart M. Beekman, 401 High St., Milton, Pa. 17847

[21] Appl. No.: 370,898

[22] Filed: Apr. 22, 1982

[51] Int. Cl.³ .................. B01J 13/00; C01F 7/14; A61K 33/08
[52] U.S. Cl. ............................ 252/315.7; 424/157; 423/628; 423/629; 423/630; 106/287.17
[58] Field of Search ................ 252/315.7; 424/157; 423/628, 629, 630

[56] References Cited

U.S. PATENT DOCUMENTS

| 3,773,918 | 11/1973 | Beekman | 423/629 |
| 3,864,142 | 2/1975 | Kovarik | 252/313.5 |
| 3,911,090 | 10/1975 | Hem et al. | 423/629 |
| 4,053,568 | 10/1977 | Madaus et al. | 424/157 |
| 4,211,667 | 7/1980 | Yamada et al. | 252/313 R |

Primary Examiner—Richard D. Lovering
Assistant Examiner—Anne Brookes

[57] ABSTRACT

A process is provided for preparing basic aluminum carbonate gels substantially free from foreign anions at a pH within the range from about 5.5 to about 7.0, according to the reactants used, and then converting such gels to high purity fibrous colloidal alumina monohydrate of the boehmite crystal lattice structure by hydrolysis with weak acids.

11 Claims, No Drawings

PROCESS FOR PREPARING BASIC ALUMINUM CARBONATE GELS SUBSTANTIALLY FREE FROM FOREIGN ANIONS AND FIBROUS COLLOIDAL ALUMINA MONOHYDRATE OF A BOEHMITE CRYSTAL LATTICE STRUCTURE

SPECIFICATION

Fibrous colloidal alumina monohydrate was first reported in the literature in 1953 as a result of electron microscope studies on the aging of amorphous colloidal aluminum hydroxide. V. P. Souza-Santos, A. Vollejo-Freire and H. L. Souza-antos, *Kolloid Zeitung* 133 101-9 (1953) reported that amorphous gels prepared at room temperature from ammonium aluminum sulfate were transformed to alumina monohydrate having the boehmite crystal lattice structure on aging for from seven to nine hours. The systems were unstable, and the fibrils of colloidal boehmite that formed were transformed to hydrated alumina crystals of the bayerite crystal lattice structure upon elimination of water.

Bugosh U.S. Pat. No. 2,915,475, patented Dec. 1, 1959, describes a process for the production of fibrous colloidal alumina monohydrate of the boehmite crystal lattice structure by hydrolysis of basic aluminum chloride and basic aluminum nitrate in aqueous solution at elevated temperature. Bugosh suggested that basic aluminum complexes of any strong monobasic acid having a dissociation constant greater than 0.1 at 25° C. could be used as the precursor, including, among others, perchloric acid, hydrobromic acid, iodic acid and trichloroacetic acid, but only the basic aluminum chloride and basic aluminum nitrate starting materials are practical for use commercially, because of cost factors.

The Bugosh product as formed is composed of sols or networks of highly dispersed positively charged boehmite microcrystals or fibrils having an average length of from 100 to 1500 millimicrons and an average width within the range from 3 to 15 millimicrons, axial ratios of from 20:1 to 300:1, and surface areas of from 200 to 400 m$^2$/g. When the sols resulting from hydrolysis of the precursor basic aluminum complexes at elevated temperature are carefully dried by spray or freeze-drying, a free-flowing, non-caking, readily dispersible, highly aggregated stable powder is obtained. However, the dried fibrils contain small amounts of adsorbed acids which desorb as hydrogen cations and acid anions when the fibrils are added to water, and with stirring reform highly dispersed positively charged fibril networks or sols. In consequence, although as Bugosh suggests the product has a great potential in a wide variety of industrial fields, the poetntial has not been realized, because the product that can be produced commercially for marketing at a reasonably competitive price has not been sufficiently pure, primarily due to the presence of adsorbed foreign ions that are liberated as contaminants in aqueous systems.

These alumina monohydrate sols have been shown by Bugosh to be of a low toxicity, to be chemically stable and highly thixotropic, and to have antibacterial properties. This fibrous colloidal alumina monohydrate is said to be the only inorganic thickening and suspending agent that is positively charged. It can be used particularly where resistance to high temperature and bacterial attack is important. A most unusual property, typical of anisotropic particles of the nature of these fibrils, is streaming birefringence, which is rare for inorganic materials. In consequence, alumina monohydrate fibrils in positively charged network or sol form are analogous to linear high molecular weight organic molecules. Human fibrinogen and tobacco mosaic virus molecules display similar properties.

Since the colloidal boehmite fibrils are both hydrophilic and organophilic, they disperse readily in water and in many organic liquids to form sols. Such sols are highly stable, and readily form cationic emulsions with polar and non-polar liquids in water. When the sols are permitted to dry on negatively charged surfaces of various types, a clear continuous coherent and adherent highly porous film of alumina monohydrate fibrils is formed which does not crack or craze. Such films, because of chemical bonding and interlocking of the fibrils, are strong bonding agents for many substances on various substrates. For example, the material strongly bonds polytetrafluoroethylene to steel and to glass; dyes to stainless steel; and resins to paper and textiles.

Heating boehmite films above 350° C. converts them to fibrils of gamma alumina, which are highly absorptive and stable. Boehmite films are also electrically conductive, which makes them useful in textiles and fibers where durable antistatic, antisoil, antistain, and antifilming properties are important. Boehmite fibrils also increase friction, abrasion resistance and dyeability of surfaces to which they are applied as coatings.

Despite these properties, fibrous colloidal alumina monohydrate has not been successfully marketed commercially. This has been due not only to the adsorbed foreign anions present as impurities, but also to difficulties in the preparatory procedure.

Bugosh in U.S. Pat. No. 2,915,475 provides thirty Examples of the preparation of fibrous colloidal boehmite from basic aluminum halide or nitrate. Each Example displays certain shortcomings. During the high temperature water hydrolysis of the basic aluminum complex precursors, alumina monohydrate AlOOH is formed, together with the aluminum salt of the basic complex used. If, for example, the 5/6 basic aluminum chloride having the formula $Al_2(OH)_5Cl xH_2O$ (which is feasible as a starting material for a commercial process because of its availability and relative cost) is hydrolyzed, for each 5 moles of AlOOH produced 1 mole of aluminum chloride $AlCl_3$ is also formed. In other Examples, aluminum nitrate is formed.

Since these salts are very acidic, there is a significant increase in acidity as the precursor compounds are hydrolyzed, reducing pH from an initial range of from 4.2 to 4.5 to a range of from about 2 to 3.

The methods of purification described by Bugosh for purifying the hydrolysis products are essential to obtain a sufficiently pure material, but none is susceptible of application in a commercial process, because of operating difficulties and cost.

In one method, the sol is added to butanol, removing the acid and water by azeotropic distillation, and then removing the butanol by vacuum-drying. Since the product is very dilute, containing only from 5 to 7% solids, the amounts of water to be removed in drying are very large, and therefore the procedure is quite expensive. The production of a highly adsorbent product totally free from traces of butanol and any impurities in the butanol is also rather difficult, and despite the high cost, there is no assurance that the final product will be odor-free.

A second procedure involves gelling the acidic sol by adding ammonium hydroxide to a pH of 10, followed by filtration, and washing the filtered cake with hot distilled water adjusted to pH 10 to remove the anion impurity as dilute ammonium salt contaminated with colloidal alumina, finally freeze-drying the filter cake to yield a very light fluffy powder. In this process, in addition to the numerous manipulative steps, a dilute contaminated ammonium salt waste stream is obtained, with a loss of perhaps 16% of the alumina in the process, and the very high cost of removing about nineteen pounds of water per pound of product by freeze-drying.

In a third procedure, the viscous sol is diluted to about 1.4% product solids, and treated with a quaternary ammonium ion exchange resin added with stirring to adsorb chloride ion, yielding a product having a $Cl/Al_2O_3$ mole ratio of 0.03:1. The resin is costly, and requires regeneration after each use by both sodium hydroxide and by gaseous carbon dioxide in separate steps. In addition, the process requires the removal of about seventy pounds of water for each pound of product produced.

All of these procedures clearly are laboratory or research procedures, and none has ever been put into commercial practice, so far as is presently known.

Bruce U.S. Pat. No. 3,031,417, patented Apr. 24, 1962, describes the preparation of basic aluminum carbonate gels by reacting excess amounts of sodium carbonate with aluminum sulfate, both of reagent grade, in dilute alkaline aqueous medium, followed by filtration and hot water washing at 70° C. The gel is hydrolyzed to the fibrous colloidal alumina monohydrate by hydrolysis at high temperature using weak volatile acids such as acetic acid or formic acid. In this process, most of the weak acid used in the hydrolysis can readily be removed by distillation during a subsequent drying step, such as in spray-drying the sol to form a powder.

Bruce explicitly noted that when the basic aluminum carbonates prepared according to the prior art before Apr. 21, 1958 were heated with weak acids according to his process, fibrous alumina monohydrate aqua sols were not obtained. This suggests that preparation of the aluminum carbonate gel is important in producing a material that can be hydrolyzed by this process to the desired fibrous colloidal alumina monohydrate.

The Bugosh disclosure of preparatory procedures encompasses the Bruce procedure for preparation of fibrous colloidal alumina monohydrate. Examples 31 to 34 of the Bugosh patent correspond to Examples of the Bruce patent: Example 31 appears to be the same as Example 12 of Bruce; Example 32 appears to be the same as Example 1 of Bruce; Example 33 appears to be the same as Example 11 of Bruce in the properties of the translucent sol, but Bruce does not refer to spray-drying; Example 34 appears to be the same as Example 4, actually differing very little from Example 32 except in the heating temperature for the hydrolysis with acetic acid.

These Examples are in accordance with the general suggestion at column 14, lines 17 to 23, of the Bugosh patent that fibrous colloidal alumina monohydrate can be produced by heating a basic aluminum carbonate gel in the presence of dilute acetic or formic acid under autogenous pressure, as described in the Bruce application which eventuated in U.S. Pat. No. 3,031,417.

Another method for manufacturing a dry aggregated colloidal fibrous alumina monohydrate that may be similar to the Bugosh product is described by Iler and Bugosh in German patent No. 1,236,487 of Mar. 16, 1967. In this process, an aluminum alcoholate is hydrolyzed. Generally speaking, the aluminum alcoholates are more expensive to prepare than water-soluble aluminum salts, and this process would also be uneconomical commercially.

Beginning in 1961 and continuing for a period of about five years, the Bugosh product was marketed in the U.S.A. under the name of BAYMAL, prepared by a procedure based on the process of Examples 31 to 34 of the Bugosh patent. The BAYMAL brochure entitled *DuPont BAYMAL Colloidal Alumina* (1961) at page 10 states the typical composition of BAYMAL as follows:

|  | % |
| --- | --- |
| Major Components | |
| AlOOH | 83.1 |
| $CH_3COOH$ | 9.8 |
| Water | 5.0 |
| $SO_4^=$ | 1.7 |
| $SO_4^=/Al_2O_3$ molar ratio 0.026 | |
| Minor Components | |
| $NH_4$ | 0.2 |
| Na | 0.07 |
| Fe | 0.02 |
| $SiO_2$ | 0.02 |
| $Al_2O_3$ | 70.6 |
| Physical Properties | |
| Specific surface area | 274 square meters per g |
| Pore volume | 0.53 cc/g |
| Pore diameter | 77 Angstroms |
| Bulk density | |
| loose | 26 lb/ft$_3$ |
| packed | 31 lb/ft$_3$ |
| Absolute density (fibril) | 2.28 g/cc |
| Refractive index (fibril) | 1.580 $n_{25}^D$ |
| Oil absorption | 147 (ASTM method D-281-31) |
| Color | White |
| pH - 4% sol | 3.8 (with KCl Bridge/calomel cell) |
| | 4.3 (no bridge) |
| Particle charge in sol | Positive |

This sulfate content is too high. The Bruce maximum ratio was 0.02 and the Bruce preferred ratio was 0.01. Due no doubt at least in part to the high $SO_4^=$ content, the product was not successful, and is no longer on the market.

The BAYMAL literature shows that the Bugosh product possesses very unusual physical chemical properties, suggesting a great potential that is very widespread and diverse, as also suggested in the Bugosh patent, including uses in drugs, cosmetics and toiletries, binders and adhesives, inorganic coatings, ceramics and refractories, food and beverages including brewing, surface modifiers and anchoring agents, thickening and suspending agents, electrical and thermal insulation, textile finishing and sizing, emulsifying and dispersing agents, mordants in paper, textiles and pigments, coagulants and adsorbents. This potential has not however been realized, as withdrawal of the BAYMAL product shows.

As noted previously, the principal difficulty with the product obtained by the Bruce and Bugosh processes is its foreign anion impurity content. In the preparatory procedure for the starting aluminum carbonate gel, the adsorption of sulfate $SO_4^=$ and monovalent sodium $Na^+$ is a particular problem. These ions are very difficult to remove except by using the special procedures developed by Bugosh, which are prohibitively expensive for commercial application.

In the Bruce process, which is the only one applied commercially, there is employed an excess of sodium carbonate relative to the amount theoretically required to react with aluminum sulfate. The optimum $CO_3$:$Al_2O_3$ mole ratio is 3.4±0.4. As a result, the pH of the reaction medium is greater than 7, and may range up to about 8.6. Under these conditions, sulfate ion and sodium ions are well adsorbed by the basic aluminum carbonate gel micelles.

Bruce fround that the sodium could be desorbed best by washing the gel at high temperatures, up to about 95° C. The sulfate ion, Bruce suggests, can be best removed by washing with cold water. Accordingly, he compromised by using water at 70° C. The washings require very large amounts of water, but even so the BAYMAL product had an undesirably high content of both $Na^+$ and $SO_4^=$.

In addition, the Bruce process is wasteful, since 0.4 mole of sodium carbonate must be discarded in the waste stream, together with 3 moles of sodium sulfate. The need for large volumes of high temperature high purity wash water adds considerably to the cost of the process. At the same time, reagent grade aluminum sulfate and sodium carbonate must also be used as reactants.

The need for reagent grade chemicals as reactants arises from recognition both by Bugosh and Bruce that impurities can profoundly affect the proper growth of the microcrystalline boehmite fibrils. Bugosh discloses that small amounts of silicon, boron and molybdenum block fiber formation. Bruce discloses that high concentrations of sulfate inhibit fiber formation and high concentrations of cation give short aggregated fibers, and that the basic aluminum carbonate gels should be washed until the sulfate ion concentration is less than about 0.01 mole/g atom of aluminum. In Table I, the preferred ratio $SO_4^=$/Al is shown to be less than 0.005:1.

loidal alumina monohydrate of the boehmite crystal lattice structure. The reactions proceed at room temperature without difficulty.

The reactants that can be used as a source of aluminum include sodium aluminate, aluminum chloride, aluminum iodide, aluminum bromide, aluminum nitrate, aluminum sulfate, and other acidic aluminum salts, as well as basic aluminum nitrate and basic aluminum halides, which are less acidic. As the source of carbonate, carbon dioxide together with ammonim hydroxide and alkali metal hydroxide, as well as alkali metal carbonates and bicarbonates, usually sodium or potassium, can be used.

The pH of the reaction depends upon the reactants used.

If sodium aluminate is reacted with carbon dioxide, the pH is about 6.8±0.2 (Reactions C and I below).

If sodium aluminate and an acidic aluminum salt are reacted with carbon dioxide, the pH is about 6.4±0.2 (Reactions A and B).

If the reactants are sodium aluminate, and acidic aluminum salt and sodium carbonate, and the percentage of total aluminum supplied by sodium aluminate is about 45% or higher, the pH should be about 6.4±0.2 (Reactions D and E below), and if the percentage is less than 45%, the pH should be about 5.75±0.2 (Reaction F).

If the reactants are an acidic aluminum salt, such as aluminum chloride or aluminum sulfate, and sodium carbonate, the pH should be about 5.7±0.2 (Reactions G and H).

If the reactants are sodium aluminate, an basic aluminum salt, and optionally sodium carbonate, the pH should be 6.0±0.2 (Reactions J, K and L).

The preferred reactants are sodium aluminate and sodium carbonate, or aluminum chloride and carbon dioxide.

The following reactions are exemplary:

| | pH | Reaction |
|---|---|---|
| A | 6.4 ± 0.2 | $3NaAlO_2 + AlCl_3 + CO_2 \rightarrow 2Al_2O_3 \cdot xCO_3 \cdot yH_2O + 3NaCl$ |
| B | 6.4 ± 0.2 | $6NaAlO_2 + Al_2(SO_4)_3 + 2CO_2 \rightarrow 4Al_2O_3 \cdot xCO_3 \cdot yH_2O + 3Na_2SO_4$ |
| C | 6.8 ± 0.2 | $2NaAlO_2 + 2.5CO_2 \rightarrow Al_2O_3 \cdot xCO_3 \cdot yH_2O + 2NaHCO_3$ |
| D | 6.4 ± 0.2 | $6NaAlO_2 + 3Na_2CO_3 + 4AlCl_3 \rightarrow 5Al_2O_3 \cdot xCO_3 \cdot yH_2O + 12NaCl$ |
| E | 6.4 ± 0.2 | $NaAlO_2 + Na_2CO_3 + AlCl_3 \rightarrow Al_2O_3 \cdot xCO_3 \cdot yH_2O + 3NaCl$ |
| F | 5.75 ± 0.2 | $3NaAlO_2 + 6Na_2CO_3 + 5AlCl_3 \rightarrow 4Al_2O_3 \cdot xCO_3 \cdot yH_2O + 15NaCl$ |
| G | 5.7 ± 0.2 | $2AlCl_3 + Na_2CO_3 \rightarrow Al_2O_2 \cdot xCO_3 \cdot yH_2O + 6NaCl$ |
| H | 5.7 ± 0.2 | $Al_2(SO_4)_3 + 3Na_2CO_3 \rightarrow Al_2O_3 \cdot xCO_3 \cdot yH_2O + 3Na_2SO_4$ |
| I | 6.8 ± 0.1 | $40NaAlO_2 + 3Na_2CO_3 + 50CO_2 + 2AlCl_3 \rightarrow 21Al_2O_3 \cdot xCO_3 \cdot yH_2O + 40NaHCO_3 + 6NaCl$ |
| J | 6.0 ± 0.2 | $2NaAlO_2 + 2Al_2(OH)_5ClxH_2O + 1.5CO_2 \rightarrow 3Al_2O_3 \cdot xCO_3 \cdot yH_2O + 2NaCl$ |
| K | 6.0 ± 0.2 | $4NaAlO_2 + 4Al_2(OH)_5ClxH_2O + Na_2CO_3 + 4CO_2 \rightarrow 6Al_2O_3 \cdot xCO_3 \cdot yH_2O + 4NaCl + 2NaHCO_3$ |
| L | 6.0 ± 0.2 | $4NaAlO_2 + 8Al_2(OH)_5ClxH_2O + 3Na_2CO_3 + 4CO_2 \rightarrow 10Al_2O_3 \cdot xCO_3 \cdot yH_2O + 8NaCl + 2NaHCO_3$ |

Note:
x = approximately 0.5 in all reactions
y = moles of free and combined water In accordance with the present invention, these difficulties are overcome and a fibrous colloidal alumina monohydrate of the boehmite lattice structure is obtained by maintaining the pH during aluminum carbonate gel formation on the acid side, within precise limits according to the reactants used. Under these conditions, the basic aluminum carbonate gels adsorb minimum amounts of foreign ions such as sulfate, chloride and sodium. The gels can thus be filtered and washed easily without using hot water to acceptable low limits of sulfate, i.e., an $SO_4^=/Al_2O_3$ ratio of less than 0.01, and a sodium $Na^+/Al_2O_3$ ratio of less than 0.01. The high purity gels thereby obtained can easily be hydrolyzed at high temperature with weak acids to form fibrous col- The process of the invention accordingly overcomes the difficulties of the Bugosh and Bruce processes in providing a simple, inexpensive procedure that is commercially practicable in producing a fibrous alumina monohydrate that can be marketed at a reasonable cost, and at the same time that has the required low content of foreign anion impurities.

The process is highly versatile in the nature and number of reactants that can be used, making possible a wide selection, according to controlling economic conditions. The necessity of washing the gels with hot water is eliminated, with a consequent energy saving. The aqueous waste streams also have reduced quantities of inorganic salt impurities, and a total absence of carbonate salt.

The resulting produce of high purity ensures optimum usefulness in the many potential fields of use enumerated by Bruce and Bugosh in their patent disclosures, as well as in the BAYMAL brochure. The very low sulfate anion content increases the potential utility in the field of drugs, toiletries and cosmetics. The product can also be used as a thickening or suspending agent, as an emulsifier, as an anchoring agent, and as a greaseless film former with greater versatility, and less concern about side reactions.

The sulfate content of most U.S. P and NF chemicals averages about 0.2%, ranging from a low of 0.005% for sucrose to a high of 0.8% for tricalcium phosphate. Soluble sulfate tends to react with trace calcium ions to produce unwanted calcium sulfate and promote inherent instability. Sulfate is also an unwelcome impurity in preparing clear colloidal boehmite sols for most industrial uses. Sodium ions are likewise disadvantageous, for similar reasons. The product produced by the process in accordance with the invention avoids these difficulties without the purification expense and complexity of the Bugosh and Bruce processes.

The process of the invention can be carried out at approximately room temperature, within the range from about 10° to about 30° C. There is no disadvantage in using more elevated temperatures when these are normal for the region, for example, up to 35° to 40° or 45° C. The reaction is normally complete within from one-half hour to one and one-half hours under these conditions, and so if the reaction is carried out as a batch or as a continuous method, a dwell time within this range is desirable.

It is important to mix the reactants during the reaction at low shear, because of possible damage to the micelles that are formed in the course of the reaction. A well-baffled reactor using a radial flat blade turbine mixer at such a speed, size and power as to provide a very high pumping capacity with very low shear is recommended. The reactants are added at the point of maximum turbulence at the intake flow of the impellers used. The rate of addition of each of the reactants except one can be set constant, with feed of one reactant controlled by a metering pump or similar device so as to control the rate of reaction and also control pH. As indicated, the pH range should be maintained at the suggested limits ±0.2 unit, in order to avoid adsorption of foreign cations and anions and peptization of the gel on filtering.

The reaction should be so carried out that the concentration of alumina in the slurry containing the precipitated reaction product is within the range from 0.5 to 2.0%. The carbonate ion-alumina $CO_3:Al_2O_3$ molar ratio should be within the range from 0.5:1 to 3:1, and preferably within the range from 0.5:1 to 1.5:1.

After completion of the reaction, the precipitated product that forms is filtered, and the product then washed. Pressure or vacuum filtration should be used, again under mild mechanical stress to the material so as to avoid damage to the gel structure.

The filtered product is washed with water at room temperature, within the range from about 40° down to about 0° C., to remove soluble electrolytes. Washing can be continued until the wash water is salt-free, or contains a negligible quantity of salt, indicating an essentially salt-free (i.e., ion-free) gel product.

The reactants employed need not be reagent grade. Iron-free low silica commerical grades of the reactant chemicals can be used. The sodium aluminate, aluminum chloride and aluminum sulfate reactants can be prepared from low iron, low silica grades of hydrated alumina, with rayon grade low iron caustic soda, and water-white grades of hydrochloric and sulfuric acids, respectively. Commerical grades of sodium aluminates such as NALCO 680W have been found to be satisfactory, but it is preferred to manufacture the sodium aluminate directly, so that the stabilizer added can be selected as well. The type and amount of stabilizer used has an effect on the physiochemical nature of the basic aluminum carbonate hydrogel produced. The stabilizers have an effect on the reaction rate of the hydrogel with weak acids, filtering and washing rates, and the degree of hydration that is the amount of dry solids in the gel, and therefore should be selected with care, on a trial and error basis according to the reaction system and reaction conditions employed.

The purified gel preferably in the form of a dewatered and aged cake is heated under autogenous pressure in the presence of an organic monocarboxylic aliphatic acid such as acetic or formic acid so that the final gel concentration is between 5 and 10% by weight expressed as $Al_2O_3$ and the ratio of aluminum atoms to acid anion is within the range from about 0.5:1 to 4.0:1.

It is advantageous to first heat the reaction mixture. The reaction mixture can optionally be refluxed to remove any free carbon dioxide.

One procedure is to form a slurry of the gel with distilled or demineralized water containing from about 5 to 10% by weight $Al_2O_3$. Preferably, the dispersion is homogenized to break up any lumps which may be present. Slurrying and homogenizing are best carried out in stainless steel equipment. The slurry is either prepared in another vessel and then placed in the reaction vessel, or is prepared directly in the reaction vessel.

After formation of the slurry, enough acid is added to the slurry to bring the ratio of aluminum to acid to from about 0.5:1 to 4.0:1. The slurry should be stirred during acid addition, in order to obtain quick and convenient mixing. The reaction vessel is preferably provided with heating means in the form of a heating jacket or walls capable of heating and maintaining the temperature of the reaction mixture within the range of from about 140° to 180° C. The vessel can be provided with a stirrer to inhibit caking on vessel walls during heating. After adding acid to the aqueous dispersion the carbonated, hydrated alumina gel goes into solution, so that a water-clear reaction mixture is obtained.

After the reactants have been charged and mixed, the reaction vessel is heated. The heating can proceed in two stages, the first of which is an optional stage. In the optional first stage, the carbonated, hydrated alumina gel, acid and water mixture is heated to a temperature sufficiently high to cause evolution of carbon dioxide. Usually this temperature is below the reflux temperature. As the carbon dioxide evolves, it can be vented. If vented, the reaction vessel should be fitted with a condenser so that the carbon dioxide can be vented from a boiling charge without loss of water or acid. By venting the carbon dioxide as formed, pressures above autogenous are avoided in this stage. When evolution ceases, the second stage can be begun.

In the required second stage, the reaction vessel is heated to a reaction temperature of from about 140° to 180° C. under autogenous pressure. The heat-up time should preferably be not longer than thirty minutes. The charge is held at reaction temperature for a period of from about ten minutes to seven hours, depending upon the temperature of the reaction and the product property desired. After the charge has been heated for the desired time, it is cooled as rapidly as possible to from about 50° to 80° C. and discharged. The cooldown time should preferably not be longer than about thirty minutes.

During the second heating stage, fibrous alumina monohydrate forms as an aquasol. The crystalline fibrous alumina monohydrate fibrils have a chemical structure corresponding to the formula AlOOH. Their average length can be from 100 mμ to 1500 mμ, but preferably from 100 mμ to 700 mμ. The fibers possess the boehmite crystal lattice. From all available evidence, the fibrils of the invention are identical to those described in U.S. Pat. No. 2,915,475 to Bugosh and U.S. Pat. No. 3,031,417 to Bruce.

The fibers have two dimensions which are in the colloidal range. Of course, fibrils may flocculate and form fibers which are supercolloidal in size. The size and shape of the particles in the product aquasols can be conveniently determined by diluting an aquasol with water to contain about 0.1% $Al_2O_3$ equivalent weight or preferably a lower weight of $Al_2O_3$, and then examining a dried film from such dilute aquasol with the electron microscope. The average length of the product is from 100 mμ to 1500 mμ. This average length can be accurately determined with the electron microscope by using the procedures described in *Introduction to Electronmicroscopy* by C. E. Hall (McGraw-Hill Book Company, 1953), and in an article by R. C. Backus and R. C. Williams in the *Journal of Applied Physics* Vol. 21, page 11, 1950, more fully described in Bugosh, U.S. Pat. No. 2,915,475.

The length of the fibrils can also be determined by streaming birefringence.

The particle size and shape of the alumina monohydrate fibrils is further defined by the specific surface area of the particle. A complete discussion of this can also be found in Bugosh, U.S. Pat. No. 2,915,475. The products of this invention in general have preferred specific surface areas ranging from around 250 to 350 m²/g although the specific surface area can range from about 200 to 400 m²/g.

The time, θ, required to dissolve one-half of a sample product in an excess of hydrochloric acid in a temperature of 98° C. is from 120 to 300 minutes.

X-ray diffraction of the fibrils discloses that they have the X-ray diffraction of boehmite and the ratio of peak intensities of the product to boehmite of a surface of less than 10 m²/g at the 020 crystal lattice plane being less than 40:100.

The infrared adsorption spectrum showing adsorption bands at the following wave lengths: 3.05, 3.25, 4.80, 5.08, 8.70, 9.11 and 13.2, the ratio of the optical desnity of the infrared adsorption band at 3.05 microns to that at 3.25 is from 1.2:1 to 1.8:1.

The products of the processes of this invention are in the form of aquasols, as has been noted. The water in the aquasol can optionally be evaporated either to producce sols having a high concentration of fibrous alumina monohydrate (fibrous boehmite) or to produce dry powders of such fibrils. When drying the sols to a power any one of a number of different conventional types of equipment can be used. For example, rotary drum drying and tray drying can be used.

Very high rates of acid recovery are possible. It has been found, however that the fibrous boehmite fibrils usually retain perhaps up to about 10% by weight of the total amount of weak acid added at the start of the heating phase.

The concentration of fibrous alumina monohydrate in the aqueous colloidal dispersions resulting from this process can be as high as 20% in the case of completely deionized sols, but in the preferred case in which acid stabilized sols are used the upper concentration limit is about 7.00% as $Al_2O_3$. The upper concentration of 7.00% alumina is fixed by the tendency of these materials to gel unless completely deionized.

The acid used to stabilize the aquasols can be acetic, formic, nitric or hydrochloric acid. The concentration of acid in the sols can be as high as 13%, but in the preferred case is less than 8%.

The following Examples in the opinion of the inventor represent preferred embodiments of the invention.

EXAMPLE 1

(A) Preparation of Basic Aluminum Carbonate Gel:

Reaction System:

Sodium aluminate-aluminum chloride-$CO_2$

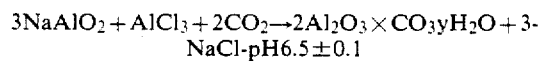

$3NaAlO_2 + AlCl_3 + 2CO_2 \rightarrow 2Al_2O_3 \times CO_3 yH_2O + 3NaCl$-pH$6.5 \pm 0.1$ The total batch weight used was 4 kg, and the concentration of alumina in the precipitated slurry was 2.0% $Al_2O_3$. 75% w/w of the total alumina was supplied by the sodium aluminate, and 25% by the aluminum chloride. The amounts of the reactants were:

238.1 g NALCO liquid grade 2375 sodium aluminate, 25.2% $Al_2O_3$, diluted to 1700 milliliters with purified tap water;

187.6 g of a 32° Bé water-white aluminum chloride solution obtained by reacting commercial water-while hydrochloric acid with ALCOA C-33 grade hydrated alumina followed by removal of iron to very low levels, containing 27.88% aluminum chloride by weight; and 34.5 g carbon dioxide equivalent to 18.41 liters at 15° C., based on a $CO_2/Al_2O_3$ molar ratio of 1:1.

The three reactants were reacted in a five-liter open plastic tank equipped with four vertical baffles. Prior to start of the reaction, 1800 ml of purified tap water was added to the reactor. A MIXCO Model G mixer was used, having a stainless steel shaft and a 2 inch diameter turbine with four radial flat blades, whose turbine diameter to blade length:blade width ratio was 20:5.4. The turbine speed was maintained at 480 rpm providing a low shear rate of 251 feet per minute, giving turbulent flow throughout the vessel.

The carbon dioxide was added at a rate of 614 ml per minute, using a flowmeter. This was double the theoretical rate to allow for low absorption efficiency in a shallow reactor. The sodium aluminate solution was added at a rate of 28.3 ml per minute, using a calibrated three-pinch valve system with constant pressure head. The aluminum chloride solution was added using a Beckman 0 to 10 ml per minute precision metering pump, set at about 9 ml per minute. The addition of the aluminum chloride solution was controlled manually, to maintain a pH in the reaction vessel within the range from 6.5±0.1. pH was measured constantly using a Beckman combination electrode in the batch. The pH meter was a Beckman Zeromatic, with digital read out. The total reaction time was sixty minutes.

11

After overnight aging, the precipitated slurry was filtered through a 24 cm Buchner funnel using a vacuum of 12 inches of mercury. The filtration cake forming time was 48 minutes. The cake was washed with ten volumes of 15° C. purified tap water. The total washing time was 6.5 hours, and the weight of the filter cake was 1208 g. Analysis of the cake showed 6.6% $Al_2O_3$ and 1.78% $CO_3$. The $CO_3/Al_2O_3$ molar ratio was 0.46:1. Chloride content was less than 0.001%, and the pH was 6.4. The $Na^+/Al_2O_3$ molar ratio was 0.006, and the $SO_4^=/Al_2O_3$ molar ratio less than 0.001.

(B) Conversion of the Gel to Fibrous Colloidal Alumina Monohydrate

After overnight aging, the 1208 g of filter cake was mixed with 354.6 g of deionized water using two cycles in a Waring Blendor. The mix was added to a four-liter stainless steel vessel, together with 36.4 g glacial acetic acid. The acidified gel was agitated and heated to 80° C. in a water bath. The carbonate was decomposed, and the gel progressively became more viscous as carbon dioxide was liberated, undergoing a decided change in phase. At the conclusion of this prehydrolysis step, the gel was fairly stiff, with no flowtrapped $CO_2$ gas, and air bubbles did not rise, even after boiling. The total weight of 5% alumina prehydrolysate was about 1600 g.

1500 g of prehydrolyzed basic aluminum carbonate gel was separated into four batches, and placed in closed glass containers. The containers were placed in a pressure vessel provided with a 0 to 100 psi gauge and a copper petcock. The hydrolysis was carried out under autogenous pressure within the closed vessels, and a pressure of 40 psig within the pressure vessel, at 141° C. for ten hours. The hydrolysate was a flowable translucent sol.

The translucent sol was dried in glass trays in an air oven at 65° C. for 39 hours. 1107 g of sol gave 79 g of flat transparent sheets of dried product.

The dried sheets were ground to a coarse powder. Analysis of the powder showed the following:

|  | % by weight |
| --- | --- |
| AlOOH | 87.8 |
| Na | 0.11 |
| $CH_3COOH$ | 9.2 |
| Water | 3.0 |
| $SO_4^=/Al_2O_3$ molar ratio | <0.001 |
| $Na^+/Al_2O_3$ molar ratio | <0.01 |
| Streaming birefringence-positive | |

Accordingly, the analysis showed the product to be fibrous colloidal alumina monohydrate of crystalline boehmite lattice structure, conforming to the properties set out in the Bugosh and Bruce patents.

A piece of wool gabardine was treated with a 2% aqueous dispersion prepared from the pulverized powder, followed by a 1% aqueous dispersion of perfluorooctanoic acid. The treated cloth showed excellent water-repellency, even after washing the dry cleaning solvent. It also had a high resistance to soiling by mineral oil, vegetable oil and motor oil. A control cloth similarly treated but without the pretreatment with the colloidal alumina was not repellent, before or after washing in solvent or water.

12

EXAMPLE 2

This Example illustrates the essentiality of carrying out the precipitation within a prescribed narrow pH range.

A. Preparation of Basic Aluminum Carbonate Gel Reaction System

Sodium aluminate-sodium carbonate-aluminum chloride 50% of the total aluminum from sodium aluminate

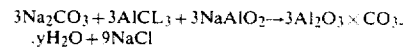

Precipitation No. 1 pH range-5.7±0.2.

The total batch weight used was 4 kg, and the concentration of alumina in the precipitated slurry was 2.0% $Al_2O_3$.

The apparatus used was similar to that used in Example I.

83.1 g sodium carbonate was dissolved in 800 ml deionized water. 87.0 g Nalco 680 w sodium aluminate was dissolved in 700 ml deionized water. The two solutions were combined in a single calibrated cylindrical polypropylene vessel and diluted with water to the 1300 ml level. The temperature was 16° C.

375.1 g of a 32° Bé water-white aluminum chloride solution containing 27.88% aluminum chloride by weight was diluted to 500 ml with deionized water and transferred to a 500 ml graduated glass cylinder. The temperature was 15° C.

The reaction was carried out by first adding 1500 ml purified tap water at 15° C. to the 5 liter polypropylene reaction vessel, starting the agitator and then adding the mixed alkaline solution at a constant rate of about 25 ml per minute. The aluminum chloride was added by means of a precision metering pump set at 9.0 ml per minute which was operated manually on an intermittant basis to maintain a constant pH in the reaction contents of 5.7±0.2. The total reaction time was sixty minutes. The pH was measured constantly using a Beckman combination electrode in the batch. The pH meter was a Beckman Zeromatic with digital read out.

After overnight aging, the slurry was filtered through a 24 cm Buchner funnel provided with a 24 cm Whatman Number 5 highly retentive filter paper using a vacuum of 12 inches of mercury.

The precipitated slurry completely peptized on being added to the filter and the whole was transmitted to the glass receiving funnel as a somewhat hazy water-white filtrate. No solids remained on the retentive filter paper.

This shows the pH of 5.7±0.2 was too low.

Precipitation No. 2 pH range—6.4±0.2.

The reaction described above was repeated, except that the pH range was maintained for the first twenty minutes at 6.4±0.2 and during the last forty minutes at 6.4±0.1.

The precipitated slurry was aged overnight and similarly filtered through a 24 cm Buchner funnel provided with a Number 5 Whatman filter paper using a vacuum of 12 inches of mercury. The cake forming time was four minutes and the total filtration time was ten minutes. The cake was washed with 20 liters of purified tap water at about 15° C. for a total washing time of 155 minutes. The filter cake weighed 1028 g, was 2.3 cm in thickness and contained 7.8% of basic aluminum carbonate gel as $Al_2O_3$. The white gel had a pH of 6.1 when diluted to 4.0% $Al_2O_3$, was very thixotropic and highly reactive with weak acid. The latter was determined by the Mutch reaction velocity test which is the time required for a sample containing the equivalent of 78% of the theoretical amount alumina required to react with a given volume of 0.1N hydrochloric acid at 37.5° C. The Mutch reaction velocity time was 70 seconds. The Na$^+$/Al$_2$O$_3$ mol ratio was 0.002, the SO$_4$=/Al$_2$O$_3$ mol ratio was <0.01, and the CO$_3$=/Al$_2$O$_3$ mol ratio was 0.45.

B. Conversion of the Gel to Fibrous Colloidal Alumina Monohydrate 102.8 g of overnight aged filter cake from above was diluted with 532 g deionized water and mixed in a Waring blendor using two cycles with each cycle providing a two minute mix at highest speed. The 1560 g of diluted gel was transferred to a 4 liter stainless steel vessel and 36.3 g glacial acetic acid added. The acidified gel was mixed and heated on a hot water bath for about thirty minutes. The temperature rose to about 80° C. Carbon dioxide was liberated and gel became a fairly viscous gel and was gradually changed to a translucent sol.

Most of the 1600 g of 5.0% Al$_2$O$_3$ translucent liquid sol was transferred to four separate 500 ml closed glass containers. The four containers were placed in a pressure vessel and hydrolyzed under autogenous pressure within the closed vessels, and a pressure at 40 psig within the pressure vessel, at 141° C. for ten hours. The hydrolysate was a liquid translucent sol.

About 1400 g of the hydrolyzed sol was added to two glass trays and placed in an air oven at 65° C. for 84 hours to yield 89.6 g of flat translucent sheets.

The dried sheets were ground to a coarse powder. Analysis of the powder showed the following:

| Ingredient | % by Weight |
| --- | --- |
| AlOOH | 89.9 |
| CH$_3$COOH | 8.7 |
| Na | 0.035 |
| Water | 1.4 |
| SO$_4$=/Al$_2$O$_3$ molar ratio | <0.001 |
| Na$^+$/Al$_2$O$_3$ molar ratio | 0.002 |
| Streaming birefringence | Positive |

Accordingly, the analysis showed the product to be fibrous colloidal alumina monohydrate of crystalline boehmite lattice structure, conforming to the properties set out in the Bugosh and Bruce patents.

EXAMPLE 3

The following is an example of the preparation of a basic aluminum carbonate gel of extremely high purity and conversion to a very high purity fibrous colloidal alumina monohydrate.

A. Preparation of Basic Aluminum Carbonate Gel

Reaction System

Sodium aluminate-sodium carbonate-basic aluminum chloride-CO$_2$

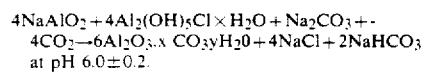

Preparation of High-Purity Sodium Aluminate 344 ml deionized water was added to a tared 2 liter nickel vessel and 235 g sodium hydroxide pellets were dissolved therein with stirring. 390.1 g Alcoa C-33 grade hydrated alumina containing 64.6% aluminum as Al$_2$O$_3$ was slowly added with stirring. The temperature was maintained at about 95° C. and the stirring continued until all the hydrated alumina was dissolved. Less than sixty minutes were required. After the solution was clear, 28.7 g d-sorbitol 70% aqueous solution was added dropwise with continued stirring. The batch was permitted to cool. The 1000 g of solution contained 25.2% Al$_2$O$_3$, 18.2% sodium as Na$_2$O, 40.5% NaAlO$_2$ based on Al$_2$O$_3$, 3.7% excess NaOH and 2% d-sorbitol. The iron content was 0.0005% as Fe.

Preparation of high purity 5/6 basic aluminum chloride 50% aqueous solution of Al$_2$(OH)$_5$Cl.xH$_2$O(Al$_2$O$_3$-23.5%).

1058 lbs deionized water and 735 lbs aluminum chloride solution 32° Bé(27.88% AlCl$_3$-iron less than 1 ppm) was charged to a 275 gallon closed top fully baffled fiberglass reinforced engineered plastic reactor equipped with a turbine-type agitator of similar material, and impervious graphite internal plate-type heat exchanger. 207 lbs aluminum powder containing 0.001 to 0.002% iron was charged and suspended in the aluminum chloride while the agitator was operating. The suspension of aluminum was heated to 95° to 100° C., and maintained at that temperature for about eight hours. During this time, 23 lbs of hydrogen was evolved. Evaporated water was condensed and was returned to the reactor vessel. The hydrogen exited from the external impervious graphite heat exchanger, where it was continuously diluted with large volumes of air. The reactor contents were cooled to 50° C., and pumped through a nonmetallic filtration system to remove trace amounts of unreacted aluminum.

The resulting clear, colorless, odorless solution had the following analysis:

| Ingredient | % by Weight |
| --- | --- |
| Al$_2$O$_3$ | 23.5 |
| Cl | 8.2 |
| Al:Cl atomic ratio | 2:1 |
| Iron as Fe | 1.9 ppm |
| Cu | <1 ppm |
| Arsenic (As$_2$O$_3$) | <1 ppm |
| Heavy metals as Pb | <1 ppm |
| Specific gravity | 1.34 |
| pH 15% solution | 4.3 |

Basic Aluminum Carbonate Reaction

In this reaction one-third of the total aluminum is derived from high-purity sodium aluminate solution and two-thirds from the high-purity basic aluminum chloride bath as prepared above.

The total batch weight used was 4 kg, and the concentration of alumina in the precipitated slurry was 2.0% Al$_2$O$_3$. The amount of the reactants were:

106 g high-purity sodium aluminate solution containing 26.7 g aluminum as Al$_2$O$_3$ was diluted to 800 ml with deionized water. 14.1 g sodium carbonate was dissolved in 500 ml deionized water. Both solutions were mixed in a two liter calibrated polypropylene cylindrical vessel and diluted to 1700 ml.

226.8 g of the high purity 5/6 basic aluminum chloride solution prepared above and containing the equivalent of 53.3 g aluminum as Al$_2$O$_3$ was placed in a 500 ml graduated glass cylinder and diluted with deionized water to the 500 ml mark.

23 g Carbon dioxide equivalent to 12.5 liters—15° C. was added.

1800 ml Deionized water was added to the 5 liter polypropylene reactor vessel described in Example 1. The temperature was 15° C.

The reaction was carried out by starting the agitator and adding the mixed alkaline solution at a constant rate of 28.3 ml per minute and 46 g $CO_2$, double the theoretical, at the constant rate of 6 ml per minute, because of low absorption efficiency in a shallow 10 cm reactor. The 5/6 basic aluminum chloride solution was added by metering pump set at 9.0 ml per minute and operated on a manual stop and start basis to maintain a constant pH of 6.1±0.1. The total reaction time was sixty minutes.

After aging overnight, the precipitated slurry was filtered through a 24 cm Buchner funnel using a vacuum of 14 inches of mercury. The filtration cake forming time was 45 minutes. The filter paper was a very retentive Number 5 Whatman. The filtrate was very slightly cloudy. The total filtration time was about sixty minutes.

The filter cake was washed with 17 liters of 15° C. tap water that had been filtered through a thin layer of aluminum hydroxide gel. The total washing time was five and three-quarter hours.

The net weight of the filter cake was 1083 g, the thickness 2.4 cm and the aluminum content was 7.4% as $Al_2O_3$. The pH of the gel was 6.0 when diluted to 4.0% $Al_2O_3$. It was highly reactive with dilute acid yielding a Mutch reaction velocity time of sixty seconds.

B. Conversion of the Gel to Fibrous Colloidal Alumina Monohydrate 1050 g of the 7.4% $Al_2O_3$ gel was diluted with 4687 ml deionized water and mixed thoroughly using two cycles in a Waring blendor at high speed with a mixing time of two minutes per cycle.

35.3 g glacial acetic acid was added to the mixed basic aluminum carbonate gel contained in an enameled two quart double boiler. The acidified carbonate gel was heated and stirred for sixty minutes. The temperature rose to 80° C. in 45 minutes and the stirring continued until all the carbon dioxide had evolved and the suspension became clear. Lost moisture was replaced. The prehydrolyzed gel was clear water-white and of a low order of viscosity.

1500 g of the prehydrolyzed basic aluminum carbonate gel was separated into four batches, and placed in closed glass containers. The containers were placed in a pressure vessel provided with a 0 to 100 psi gauge and a copper petcock. The hydrolysis was carried out under autogenous pressure within the closed vessels, and a pressure of 40 psig within the pressure vessel, at 141° C. for ten hours.

The almost clear sol was of a low order of viscosity. 1301 g was dried in two glass trays in an air oven at 65° C. for 48 hours. 83 g of thin dried almost transparent sheets of dried product were obtained.

The dried sheets were ground to a coarse powder. Analysis of the powder showed the following:

| Ingredient | % by Weight |
|---|---|
| AlOOH | 83.0 |
| CH₃COOH | 9.4 |
| Water | 7.6 |
| Na | 0.014 |
| Fe | .0011 |
| Cl⁻/Al₂O₃ | <.01 |

| Ingredient | % by Weight |
|---|---|
| SO₄⁼/Al₂O₃ molar ratio | <.001 |
| Na⁺/Al₂O₃ molar ratio | <.001 |
| Streaming birefringence | Positive |

Accordingly, the analysis showed the product to be fibrous colloidal alumina monohydrate of crystalline boehmite lattice structure, conforming to the properties set out in the Bugosh and Bruce patents.

EXAMPLE 4

A. Preparation of Basic Aluminum Carbonate Gel

Reaction System

Sodium aluminate-$CO_2$

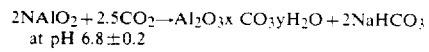

at pH 6.8±0.2

The total batch weight used was 8 kg, and the concentration of alumina in the precipitated slurry was 0.5% $Al_2O_3$. The amount of the reactants were:

158.7 g Nalco liquid grade 2375 sodium aluminate, 25.2% $Al_2O_3$ diluted to 300 milliliters with deionized water.

43.1 g carbon dioxide is the theoretical amount required, double that amount equivalent to 86.2 g having a total volume of 46,000 ml at 15° C. was used because of lower absorptive efficiency of carbon dioxide gas in a shallow reactor having a maximum depth above the intake tube of 10 cm.

1500 ml of deionized water was added to a two liter polypropylene cylindrical reactor 11 cm in diameter and 22 cm deep. It was provided with two vertical baffles, and a 2 inch stainless steel turbine-type agitator and shaft which was connected to a drive equipped to operate the turbine at 480 rpm. The reactor was also provided with a Beckman combination pH electrode connected to a Beckman Zeromatic pH meter with digital read out.

The reaction was initiated by first starting the agitator and adding the sodium aluminate solution by a Beckman precision metering pump set at 5.0 ml per minute to the point of maximum turbulence within the reactor. This is at the flow intake of the radial flat blade turbine. Simultaneously, with the addition of the sodium aluminate solution, carbon dioxide was added by the use pressure-reducing valves and a flow meter set at a minimum flow rate of 766 ml per minute. The $CO_2$ was also added at the point of maximum turbulence using a glass tube with a fritted glass filter affixed to the discharge end.

The flow rate of the sodium aluminate was constant at 5.0 ml per minute and the flow rate of the $CO_2$ was throttled to maintain a pH range of 6.9±0.1.

After fifteen minutes of reaction, deionized water was added through a flow meter at a flow rate of 137.8 ml per minute. When the reactor vessel reached a level of 1.9 liters, it was permitted to overflow through an adjustable glass and rubber syphon to a three liter polypropylene vessel at a lower level. Thus, the reactor was operated continuously with a dwell time of about fifteen minutes. The total reaction time was sixty minutes, and the 1.9 liters remaining in the reactor was combined with the 6.1 liters of overflow slurry. The reaction temperature was about 15° C.

The combined slurry was aged overnight and filtered through a 24 cm Buchner funnel using a vacuum of 12 inches. The cake forming time was 40 minutes. The cake was washed with 10 liters of deionized water. The total washing time was five hours, the weight of the cake was 625 g with an average thickness of 1.4 cm and aluminum content of 6.4% $Al_2O_3$. The basic aluminum carbonate was highly reactive with weak acid having a Mutch reaction velocity time of 88 seconds.

B. Conversion of the Gel to Fibrous Colloidal Alumina Monohydrate

After overnight aging, 600 g of the 6.4% $Al_2O_3$ cake was mixed with 151 ml deionized water and transferred to a Waring blendor for agitation at high speed for two minutes. 17.5 g of glacial acetic acid was added to the dilution.

The diluted gel after the high shear mixing was transferred to the inner container of an enameled two quart double boiler. 17.5 g glacial acetic acid was added and the acidified gel was heated and mixed by a rubber-tipped glass stirring rod. The basic aluminum carbonate gel decomposed with the liberation of carbon dioxide. Stirring and heating continued until the temperature reached 80° C. The temperature and stirring was continued until the dissolution of the basic aluminum carbonate was complete. Water lost through evaporation was replaced and the result was a mildly viscous translucent sol. The total heating and mixing time was 65 minutes.

768 g of the prehydrolyzed gel containing 5% alumina was transferred to two separate 500 ml closed glass containers. The hydrolysis was carried out under autegenous pressure within the closed vessels, and a pressure of 40 psig within a surrounding pressure vessel, at 141° C. for ten hours. The hydrolysate was a flowable translucent sol.

728 g of the sol was dried in a single glass tray in an air oven at 65° C. for 27 hours. 50.4 g of flat translucent sheets resulted.

The dried sheets were ground to a coarse powder. Analysis of the powder showed the following:

| Ingredient | % by Weight |
|---|---|
| AlOOH | 92.0 |
| $CH_3COOH$ | 6.8 |
| Water | 1.4 |
| Na | <0.001 |
| $SO_4^=/Al_2O_3$ molar ratio | <0.001 |
| $Na^+/Al_2O_3$ molar ratio | <0.001 |
| Streaming birefringence | Positive |

Accordingly, the analysis showed the product to be fibrous colloidal alumina monohydrate of crystalline boehmite structure, conforming to the properties set out in the Bugosh and Bruce patents.

EXAMPLE 5

A. Preparation of Basic Aluminum Carbonate Gel

Reaction System

Sodium aluminate-aluminum sulfate—$CO_2$. Reaction:

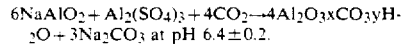
$6NaAlO_2 + Al_2(SO_4)_3 + 4CO_2 \rightarrow 4Al_2O_3 \cdot xCO_3 \cdot yH_2O + 3Na_2CO_3$ at pH 6.4±0.2.

The total batch weight was 4 kg, and the concentration of alumina in the precipitated slurry was 2.0% $Al_2O_3$. 75% w/w of the total alumina was supplied by the sodium aluminate and 25% by the aluminum sulfate. The reaction time was sixty minutes. The amounts of reactants were:

238.1 g Nalco 2375 liquid sodium aluminate diluted with deionized water to yield 1700 ml. The solution was added to a calibrated two liter polypropylene cylindrical vessel.

116.3 g commercial aluminum sulfate (17.2% $Al_2O_3$) was dissolved in 300 ml deionized water, diluted to 500 ml and added to a 500 ml graduated glass cylinder.

34.5 g carbon dioxide equivalent to 18.4 liters at 15° C. is the theoretical amount. The actual amount of $CO_2$ used was double the theoretical to allow for low absorption efficiency in a shallow reactor vessel (<10 cm).

The apparatus used was similar to that described in Example 1. Prior to the start of the reaction 1800 ml of purified tap water was added to the polypropylene five liter reactor.

After starting the agitator the carbon dioxide was added at a constant rate of 610 ml per minute, the sodium aluminate was added at a constant rate of 28.3 ml per minute, and the aluminum sulfate solution discontinuous at 9.0 ml per minute, providing the manual means of maintaining the pH level of the reactants at 6.5±0.1.

After overnight aging, the precipitated slurry was filtered through a 24 cm Buchner funnel using a vacuum of 14 inches of mercury. A Whatman Number 1 filter paper was used having low retentivity. Some colloidal alumina appeared in the filtrate which was recycled after twenty minutes to yield a clear filtrate. After recycling, the filtration time was sixty minutes to cake forming time. The cake was washed with nine liters of 15° C. tap water for a total time of about six hours.

The filter cake weighed 1350 g, was 2.98 cm in thickness, and mildly thixotropic. It contained 5.9% aluminum as $Al_2O_3$, had a $CO_3^=/Al_2O_3$ molar ratio of 0.45/1, and had a pH of 5.8 when diluted to 4% $Al_2O_3$. It was also highly reactive with dilute acid as evidenced by a Mutch reaction velocity time of 90 seconds. The $SO_4^=/Al_2O_3$ molar ratio was <0.01 and the $Na^+/Al_2O_3$ molar ratio was 0.001.

Hot Water Washing of 50% of the Filter Cake 675 g which is half of the 1350 g of filter cake which had been washed solely with 15° C. tap water was thoroughly mixed with 350 ml tap water. The 1025 g of cold dispersed gel was added to six liters of hot (95° C.) tap water, mixed for thirty minutes while maintaining the temperature at about 90° C., and refiltered through a 24 cm Buchner funnel. The filtration time was forty minutes and provided a cake which weighed 506 g, was 1.4 cm thick, and contained 7.9% alumina as $Al_2O_3$.

B. Conversion of the Gels to Fibrous Colloidal Alumina Monohydrate

Each of the gels prepared above: the 675 g of 5.9% $Al_2O_3$ which had been cold water washed using washwater to gel volume of 6.7:1 and the 506 g of 7.9% $Al_2O_3$ gel which had an additional 8.9:1 hot water wash were each diluted to 5.0% $Al_2O_3$ with deionized water subjected to high shear mixing in a Waring blendor at high speed for two minutes and each mixed, heated and stirred with 18.2 g glacial acetic acid in a prehydrolysate treatment to decompose the basic aluminum carbonate gels and form thick sols for hydrolysis.

Each of the above separately treated sols were added to two 500 ml closed glass containers which were added to a common pressure vessel and processed under autogenous pressure for ten hours, at 50 psi gauge pressure and 141° C.

660 g of each hydrolysate both made from the same basic aluminum carbonate gel but one washed copiously with hot water in addition to cold water washing, were added to separate glass trays which were added to an air oven maintained at 65° C. Both were dried for forty hours and each yielded 44 g of dried flat sheets. The flat sheets were pulverized separately to coarse powders and transferred to separately marked containers. Each sample was analyzed providing the following results:

| | SAMPLE | |
|---|---|---|
| | % by Weight | |
| Entity | Gel washed with cold water only | Gel washed additionally with hot water |
| AlOOH | 92.0 | 89.9 |
| $CH_3COOH$ | 6.9 | 8.2 |
| Water | 1.3 | 1.3 |
| $SO_4^=$ | 0.7 | 0.7 |
| Na | 0.02 | 0.03 |
| $SO_4^=/Al_2O_3$ molar ratio | 0.009 | 0.009 |
| $Na^+/Al_2O_3$ molar ratio | 0.0011 | 0.0017 |
| Streaming birefringence | Positive | Positive |

Conclusion

In the case of this reaction there is no advantage to be gained in washing the basic aluminum carbonate precurser gel with hot water.

Accordingly, the analysis showed the product to be fibrous colloidal alumina monohydrate of crystalline boehmite lattice structure, conforming to the properties set out in the Bugosh and Bruce patents.

EXAMPLE 6

A. Preparation of Basic Aluminum Carbonate Gel

Reaction system

Sodium aluminate-sodium carbonate-aluminum chloride

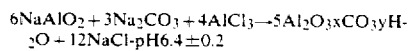

$$6NaAlO_2 + 3Na_2CO_3 + 4AlCl_3 \rightarrow 5Al_2O_3 \cdot xCO_3 \cdot yH_2O + 12NaCl\text{-}pH6.4 \pm 0.2$$

The total batch weight was 4 kg and the concentration of alumina in the precipitated slurry was 2.0% $Al_2O_3$. 60% w/w of the total alumina was supplied by the sodium aluminate and 40% w/w by the aluminum chloride. The amount of the reactants were:

104.3 g Nalco 680 W solid sodium aluminate in 1000 ml purified tap water at about 15° C.

50.9 g sodium carbonate was dissolved in the sodium aluminate solution and the combined solution was diluted to 1700 ml with purified tap water and transferred to a two liter graduated polypropylene cylindrical open top container.

315 g of water-white 32° Bé aluminum chloride solution representing 105% w/w of the theoretical amount required and having a concentration of 27.88% w/w of $AlCl_3$ was diluted with purified tap water to 500 ml, and added to a 500 ml graduated glass cylinder.

The three reactants were reacted in a five liter polypropylene reactor vessel provided with four vertical baffles, radial flat blade turbine-type agitator and combination pH electrode as described in Example 1.

The total reaction time was sixty minutes. Prior to starting the reaction, 1800 ml purified tap water was added to the reactor. The agitator providing high turbulent flow but low shear was started. The combined sodium aluminate-sodium carbonate solution was added at the constant rate of 28.3 ml per minute. The aluminum chloride was added by use of a precision metering pump set at 9.0 ml per minute. The operation of the pump was manual and the start/stop switch was operated to maintain a constant pH of the reactor contents of 6.5±0.1.

After overnight aging the precipitated slurry was filtered through a 24 cm Buchner funnel using a vacuum of 14 inches of mercury. The cake forming time was six minutes with a total filtration time of ten minutes. The cake was washed with 22.5 liters tap water at 15° C. The total washing time was 2.1 hours. The cake weighed 819 g, was 1.8 cm thick and contained 9.8% alumina as $Al_2O_3$. The pH level of the basic aluminum carbonate gel diluted to 4% $Al_2O_3$ was 5.9. The gel was slightly thixotropic and highly reactive with weak acid, yielding a Mutch reaction velocity, test time of only 95 seconds. The basic aluminum carbonate gel had a $Na^+/Al_2O_3$ molar ratio of 0.001, a $CO_3^=/Al_2O_3$ molar ratio of 0.44, a $Cl^-/Al_2O_3$ molar ratio of 0.004 and a $SO_4^=/Al_2O_3$ molar ratio of <0.001.

B. Conversion of the Gel to Fibrous Colloidal Alumina Monohydrate

After overnight aging, 800 g of the 9.8% $Al_2O_3$ filter cake was diluted with 732 g deionized water and mixed in a Waring blendor at high speed for two minutes using two mixing cycles. The highly sheared washed basic aluminum carbonate gel having an $Al_2O_3$ content of 5.1% w/w was added to the mixing bowl of an enameled double boiler. 36.0 g glacial acetic acid was added to the gel and the acidified mixture was heated and mixed with a rubber tipped glass stirring rod. Heating and mixing required about sixty minutes. The basic aluminum carbonate gel completely decomposed, the carbon dioxide was liberated and a mildly viscous somewhat translucent sol resulted. The maximum temperature during the mixing and heating was about 80° C. Water was added to restore the original weight of 1568 g to the 5.0% $Al_2O_3$ sol.

The translucent sol was separated into four separate batches, and placed in closed glass containers having a capacity of 500 ml each. The containers were placed in a pressure vessel provided with a 0 to 100 psi gauge and copper petcock. The hydrolysis was carried out under autogenous pressure within the closed vessels, and a pressure of 40 psig within the pressure vessel, at 141+ C. for ten hours. The hydrolysate was a flowable translucent sol.

The translucent sol was dried in two glass trays in an air oven at 65° C. for ten hours. 1401 g of sol gave 89 g of flat translucent sheets of dried product.

The dried sheets were ground to a coarse powder. Analysis of the powder showed the following:

| Ingredient | % by Weight |
|---|---|
| AlOOH | 89.9 |
| $CH_3COOH$ | 8.6 |
| Water | 1.5 |
| Na | 0.01 |
| $SO_4^=/Al_2O_3$ molar ratio | <0.001 |
| $Na^+/Al_2O_3$ molar ratio | 0.001 |
| $Cl^-/Al_2O_3$ molar ratio | 0.004 |

-continued

| Ingredient | % by Weight |
|---|---|
| Streaming birefringence | Positive |

EXAMPLE 7

A. Preparation of Basic Aluminum Carbonate Gel

Reaction system

Aluminum sulfate-sodium carbonate $$Al_2(SO_4)_3 + 3Na_2CO_3 \rightarrow Al_2O_3xCO_3yH_2O + 3Na_2SO_4\text{-pH } 5.7 \pm 0.2.$$

The total batch weight used was 4 kg, and the concentration of alumina in the precipitated slurry was 1.5% $Al_2O_3$. The amounts of reactants used were:

187 g sodium carbonate were dissolved in 1371 ml deionized water providing 1558 g of a 12% w/w solution having a specific gravity of 1.124 and a volume of 1386 ml. This solution was transferred to a two liter cylindrical graduated open top vessel.

353 g iron-free commercial aluminum sulfate having an aluminum content of 17.2% w/w was dissolved in 485 ml deionized water providing 838 g of a 24° Bé solution having a specific gravity of 1.2803 and hence a volume of 654 ml.

1604 ml purified tap water was added to a five liter polypropylene fully baffled reactor vessel, provided with a two inch radial flat blade stainless steel turbine operated at 480 rpm and also provided with a Beckman combination pH electrode connected to a Beckman Zeromatic pH meter with digital read out.

After starting the agitator both solutions were added simultaneously to the reactor at the point of maximum turbulence-the intake flow of the radial blade turbine. Both fluids were added by means of precision metering pumps. The sodium carbonate solution was added at the constant rate of 23.1 ml per minute. The aluminum sulfate solution pump was set to operate at 12.0 ml per minute but was operated manually and intermittently to maintain the pH level of the reactor contents at $5.7 \pm 0.2$. The reaction time was sixty minutes. The temperature of the batch averaged about 15° C.

After overnight aging, the precipitated slurry was filtered through a 24 cm Buchner funnel using a vacuum of 14 inches of mercury. The cake forming time was forty minutes, the total filtration time fifty minutes, and the total washing time with 12 liters of 15° C. purified tap water was 3.7 hours. The filter cake weighed 1070 g.

Analysis of the filter cake showed that it contained 5.6% aluminum as $Al_2O_3$, 0.38% sulfate, 0.004% sodium, had a pH of 6.2, a $CO_3^=/Al_2O_3$ molar ratio of 0.48, a $SO_4^=/Al_2O_3$ molar ratio of >0.01 and a $Na^+/Al_2O_3$ molar ratio of 0.003. A Mutch reaction velocity test time of seventy seconds showed that the basic aluminum carbonate gel was highly reactive with weak acids.

B. Conversion of the Gel to Fibrous Colloidal Alumina Monohydrate

After overnight aging, 1000 g of the filter cake was mixed with 94 ml deionized water followed by high shear mixing in two cycles of two minutes each at highest speed.

The 1094 g of gel was added to a two liter enameled steel double boiler together with 25.7 g of glacial acetic acid. The acidified gel was mixed and heated to 80° C. and maintained at about that temperature with continued mixing with a heavy rubber tipped glass stirring rod for about sixty minutes. The gel completely dissolved with the formation of an almost clear slight translucent sol. Deionized water was added to restore the batch weight to 1120 g with a concentration of 5.0% $Al_2O_3$.

1100 g of prehydrolyzed basic aluminum carbonate gel was divided into three batches, and placed in 500 ml closed glass containers. The containers were placed in a pressure vessel provided with a pressure gauge having a range of 0 to 100 psi and a copper petcock. The hydrolysis was carried out under autogenous pressure within the closed vessels, and a pressure of 40 psig within the pressure vessel, at 141° C. for ten hours.

The translucent sol hydrolysate was dried in two glass trays in an air oven at 65° C. for 44 hours, and 1005 g of sol dried to 65.2 g of flat translucent sheets of dried product.

The dried sheets were ground to a coarse powder. Analysis of the powder showed the following:

| Ingredient | % by Weight |
|---|---|
| AlOOH | 90.5 |
| $CH_3COOH$ | 8.2 |
| Water | 1.3 |
| $SO_4^=$ | 0.038 |
| Na | 0.04 |
| $SO_4^=/Al_2O_3$ molar ratio | <0.001 |
| $Na^+/Al_2O_3$ molar ratio | 0.002 |
| Streaming birefringence | Positive |

Accordingly, the analysis showed the product to be fibrous colloidal alumina monohydrate of crystalline boehmite lattice structure, conforming to the properties set out in the Bugosh and Bruce patents.

EXAMPLE 8

A. Preparation of Basic Aluminum Carbonate Gel

Reaction system

Aluminum chloride-sodium carbonate $$2AlCl_3 + 3Na_2CO_3 \rightarrow Al_2O_3xCO_3yH_2O + 6NaCl\text{-pH } 5.7 \pm 0.2$$

The total batch weight was 4 kg, and the concentration of alumina in the precipitated slurry was 1.5% $Al_2O_3$. The amounts of reactants used were:

187 g sodium carbonate were dissolved in 1371 ml deionized water, providing 1386 ml of a 12% w/w solution. The solution was transferred to a two liter graduated cylindrical polypropylene open top vessel. Additional deionized water was mixed with the solution to increase the volume to 1700 ml.

562.8 g 32° Bé water-white aluminum chloride solution containing 27.88% $AlCl_3$ by weight was added to a 500 ml graduated glass cylinder, mixed with deionized water sufficient to raise the level to the 500 ml mark.

1800 ml deionized water was added to a five liter polypropylene reactor provided with four vertical baffles, a radial flat blade turbine-type agitator and combination pH electrode as described in Example 1.

After starting the agitator the reaction was carried out by adding the sodium carbonate solution at the constant rate of 28.3 ml per minute. Aluminum chloride solution was added intermittently at 9.0 ml per minute to maintain the pH level of the reactor contents at $5.7 \pm 0.2$. Control of the aluminum chloride precision metering pump was carried out manually. The reaction time was sixty minutes.

After overnight aging, the precipitated slurry was filtered through a 24 cm Buchner funnel using a vacuum of 14 inches of mercury. The cake forming time was five minutes, the total filtration time was eight minutes and the cake was washed with 17 liters 15° C. purified tap water in sixty-one minutes. The cake weighed 724 g, contained 8.2% w/w of alumina as $Al_2O_3$ and the $CO_3^=/Al_2O_3$ molar ratio was 0.47. The pH of a 4% $Al_2O_3$ dispersion was 5.8, the $SO_4^=/Al_2O_3$ molar ratio was less than 0.001, the $Na^+/Al_2O_3$ molar ratio was 0.004, and the $Cl^-/Al_2O_3$ molar ratio was 0.004. The basic aluminum carbonate gel was highly reactive with weak acid, since the Mutch reaction velocity test time was only 72 seconds.

B. Conversion of the Gel to Fibrous Colloidal Alumina Monohydrate

After overnight aging 700 g of the filter cake was mixed and blended with 422 ml deionized water and mixed at high shear in a Waring blendor using two cycles at high speed for two minutes mixing per cycle.

The diluted mixed gel was added to an enameled steel two liter double boiler together with 26.4 g glacial acetic acid. The acidified carbonate gel was heated and mixed continuously for about thirty minutes, during which time the temperature slowly increased to 80° C. Mixing and continued heating at 80° C. was carried out for an additional thirty minutes. During this time the basic aluminum carbonate completely dissolved to yield a mildly viscous slightly translucent sol. The evaporated water was replaced to yield 1148 g of 5% alumina prehydrolysate.

1040 g of the prehydrolyzed basic aluminum carbonate gel was separated into three separate batches, and placed in closed glass containers. The containers were placed in a pressure vessel provided with a 0 to 100 psi gauge and a copper petcock. The hydrolysis was carried out under autogenous pressure within the closed vessels, and a pressure of 40 psig within the pressure vessel, at 141° C. for ten hours. The hydrolysate was a flowable translucent sol.

The translucent sol was dried in two glass trays in an air oven at 65° C. for 42 hours. 1115 g of sol provided 72.4 g translucent flat sheets of dried product.

The dried sheets were ground to a coarse powder. Analysis of the powder showed the following:

| Ingredient | % by Weight |
|---|---|
| AlOOH | 89.9 |
| CH$_3$COOH | 8.1 |
| Water | 2.0 |
| Na | 0.08 |
| SO$_4$$^=$/Al$_2$O$_3$ molar ratio | <0.001 |
| Na$^+$/Al$_2$O$_3$ molar ratio | 0.004 |
| Streaming birefringence | Positive |

Accordingly, the analysis showed the product to be fibrous colloidal alumina monohydrate of crystalline boehmite lattice structure, conforming to the properties set out in the Bugosh and Bruce patents.

Having regard to the foregoing disclosure, the following is claimed as the patentable and inventive embodiments thereof:

1. A process for preparing basic aluminum carbonate gels that can be washed to an $SO_4^=/Al_2O_3$ ratio of less than 0.01 and a sodium $Na^+/Al_2O_3$ ratio of less than 0.01 which comprises reacting in aqueous solution having a pH of about 6.8±0.2 at a temperature within the range from about 10° to about 50° C. sodium aluminate and carbon dioxide, thereby forming a precipitate of basic aluminum carbonate gel, and separating the gel from the reaction medium by filtration.

2. A process according to claim 1 in which the reaction mixture includes an acidic aluminum salt in addition to sodium aluminate, and the pH is 6.4±0.2.

3. A process according to claim 2 in which the acidic aluminum salt is $AlCl_3$.

4. A process according to claim 2 in which the acidic aluminum salt is $Al_2(SO_4)_3$.

5. A process according to claim 1 which includes washing the gel with water to remove water soluble salts.

6. A process according to claim 1 in which the reaction mixture includes an basic aluminum salt and the pH is 6.0±0.2.

7. A process according to claim 6 in which the basic aluminum salt is 5/6 basic aluminum chloride $Al_2(OH)_5ClxH_2O$.

8. A process according to claim 1 in which the reaction mixture includes an basic aluminum salt and sodium carbonate, and the pH is 6.0±0.2.

9. A process according to claim 8 in which the basic aluminum salt is 5/6 basic aluminum chloride $Al_2(OH)_5ClxH_2O$.

10. A process according to claim 1 which comprises converting such gel to fibrous colloidal alumina monohydrate of the boehmite crystal lattice structure by hydrolysis with weak acid.

11. A process according to claim 10 in which the weak acid is an organic monocarboxylic aliphatic acid.

* * * * *